Figure 1:
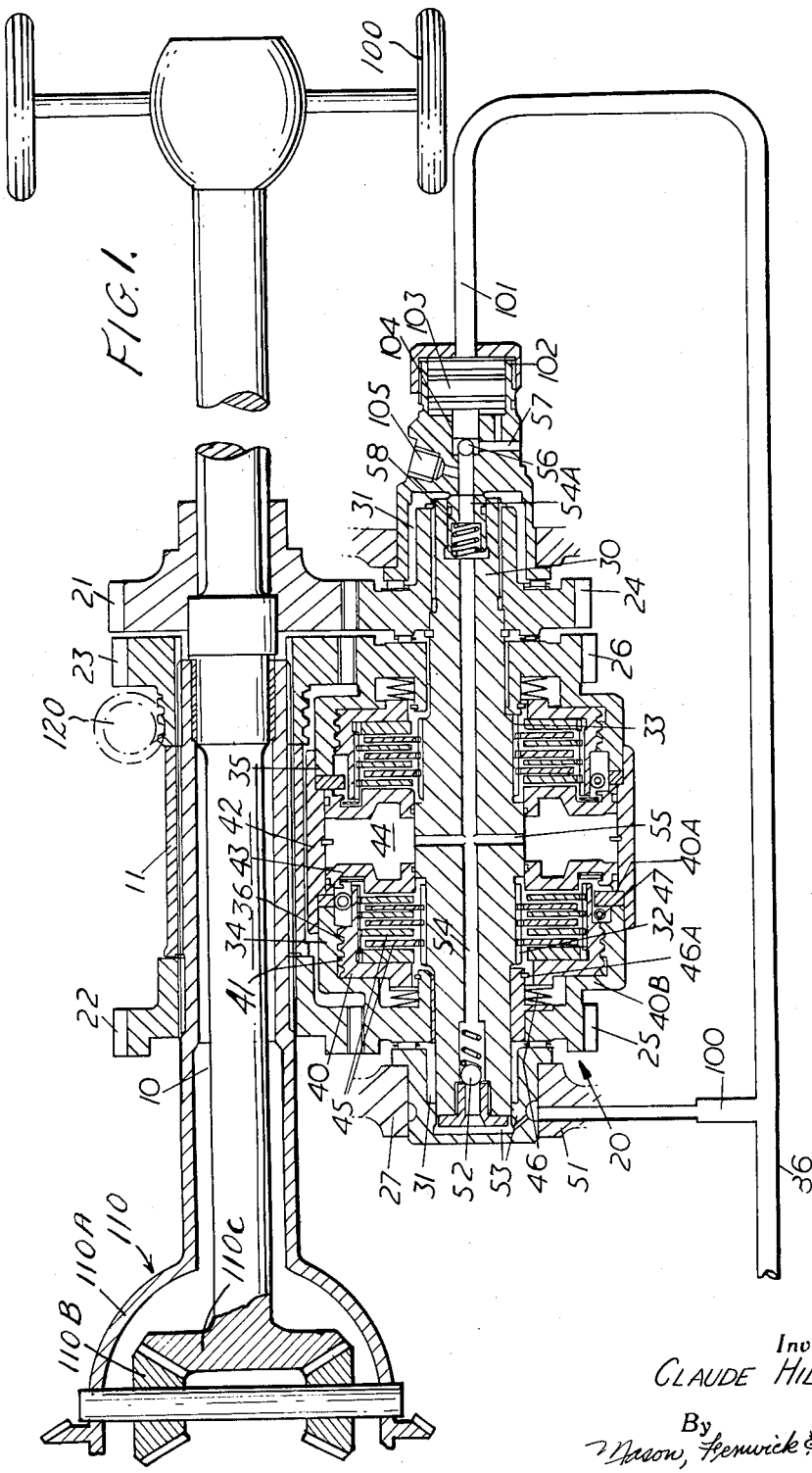

July 19, 1966 C. HILL 3,261,231
MOTOR VEHICLE TRANSMISSION MECHANISM
Filed Aug. 21, 1962 2 Sheets-Sheet 1

Inventor
CLAUDE HILL
By
Mason, Fenwick & Lawrence
Attorneys

Inventor
CLAUDE HILL
By Mason, Fenwick & Lawrence
Attorneys

United States Patent Office 3,261,231
Patented July 19, 1966

3,261,231
MOTOR VEHICLE TRANSMISSION MECHANISM
Claude Hill, Kenilworth, England, assignor to Harry Ferguson Research Limited, "Abbotswood," Stow-on-the-Wold, England, a British company
Filed Aug. 21, 1962, Ser. No. 218,267
Claims priority, application Great Britain, Aug. 22, 1961, 30,185/61
10 Claims. (Cl. 74—711)

This invention relates to motor vehicles having transmission mechanism of the type in which the engine power is transmitted through a controlled differential gear, namely a differential gear combined with control means for limiting its differential action in certain circumstances. That is to say, each of the two output shafts of the gear is permitted to differ in speed from the other only within determinate higher and lower limits, the arrangement being such that adequate freedom for steering is allowed.

A controlled differential gear may be interposed between the transverse half shafts of a pair of engine-driven roadwheels.

In a vehicle in which both rear and front roadwheels are engine-driven and in which conventional rear and front differential gears are interposed between the transverse rear and front half shafts, a controlled differential gear may be interposed as a central gear dividing the engine output between the longitudinal propeller shafts which drive the rear and front differential gears.

The main purpose of using a controlled differential gear is to prevent or hinder locking with subsequent skidding of a roadwheel under braking which is excessive in relation to road surface conditions and to prevent spinning of a roadwheel under poor road surface conditions.

In the driving of motor vehicles having transmission mechanisms of the type stated, there are encountered from time to time various circumstances under which it is necessary or desirable to disable the control means limiting the differential action, such circumstances including notably reverse driving.

An object of the present invention is to provide in a motor-vehicle transmission of the type stated a hydraulic appliance which automatically disables the control means in the event that the vehicle ceases to travel forwards. Otherwise stated, forward motion of the vehicle is a prerequisite to effectiveness of the differential-limiting means.

The hydraulic appliance is applicable to a control means which relies for its effectiveness to limit the differential action upon the maintenance of pressure in a hydraulic clutch device which is connected with components of the controlled differential gear. The said device, of which an example will be described, is referred to hereinafter in general as the "hydraulic clutch device."

According to the present invention we provide a hydraulic appliance for disabling the control means of a controlled differential gear in a motor-vehicle transmission mechanism of the type stated, the control means including a hydraulic clutch device connected with components of the differential gear; said appliance comprising a hydraulic pump having a driving connection with a roadwheel of the vehicle so that the pump is operative only during forward motion of the vehicle, a valve assembly through which liquid from the pump is supplied to the hydraulic clutch device and is exhausted therefrom, alternatively, and a member which is included in said driving connection and is displaceable by the reaction to the pumping action so as to maintain said valve assembly open to supply and closed to exhaust, said member being returnable on cessation of the forward drive from the roadwheel so as to exhaust the hydraulic clutch device.

The liquid supply to the valve assembly may be both from the roadwheel-driven pump and from an engine-driven pump so that the supply is available after normal engine starting of the vehicle and during downhill starting of the engine and starting under tow.

The invention is illustrated by the accompanying drawings, which are partly diagrammatic. In the drawings, FIGS. 1 and 2 together constitute a composite view, FIG. 1 showing the hydraulic clutch device and FIG. 2 showing the hydraulic appliance for disabling said device.

The invention is illustrated as applied to a controlled differential gear in a motor-vehicle having a four-wheel drive, the controlled differential gear being interposed as a central gear dividing the engine output between two longitudinal propeller shafts which respectively drive conventional differential gears between the half shafts of the rear and front pairs of roadwheels.

Figure 2:
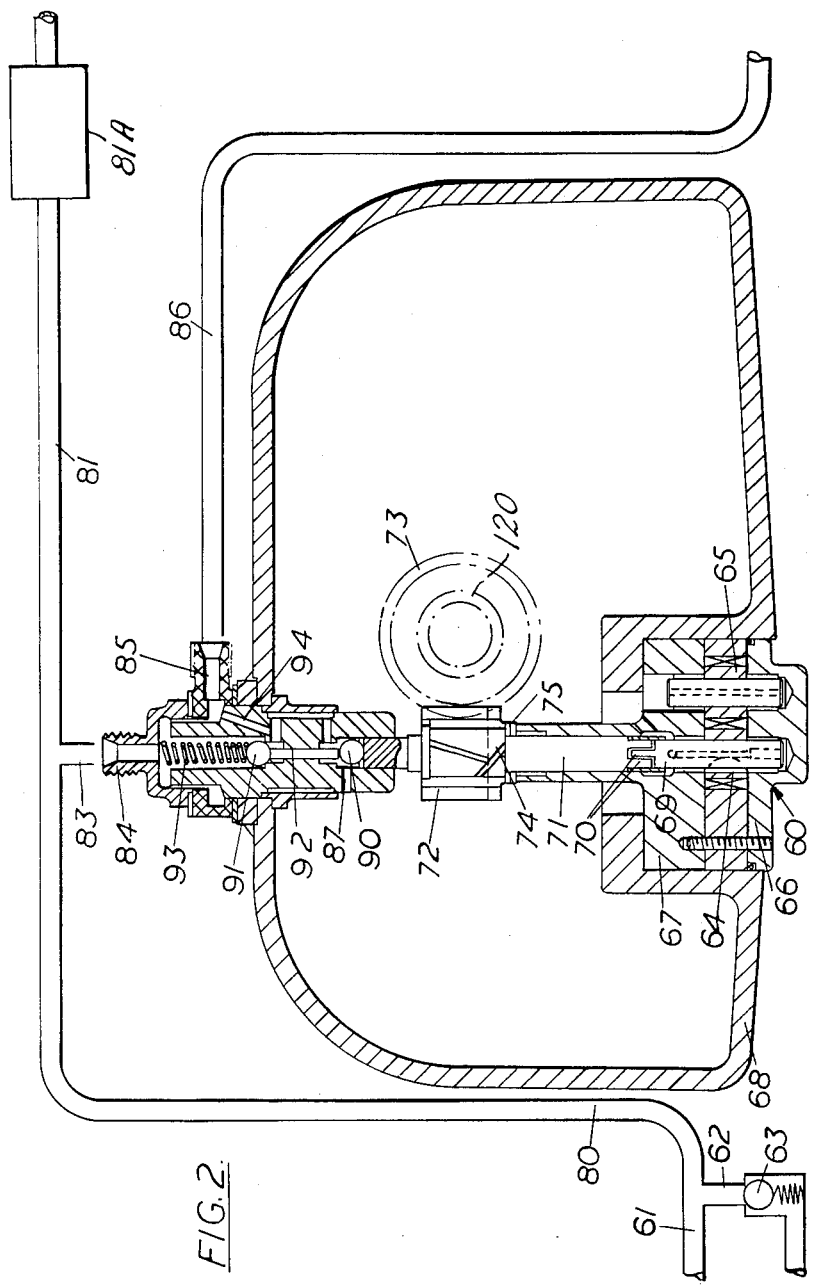

In FIG. 1, the rear propeller shaft is shown, being indicated by 10. The rear propeller shaft 10 extends to a rear differential having two half shafts each drivingly connected to a rear ground engaging roadwheel 100. This shaft is secured to one of the sunwheels 110C of the controlled central differential gear indicated at 110. This differential gear comprises, as usual, a planet carrier 110A, planet wheels 110B and a pair of opposed coaxial sunwheels 110C. The planet carrier 110A is the input component of the differential gear. The sunwheels 110C are the output components. The planet carrier 110A is driven from the engine through change-speed gearing, which may include a hydraulic torque converter, and a reversing gear. The planet carrier 110A has formed intergrally therewith a hollow shaft 11, through which the rear propeller shaft 10 extends.

The hydraulic clutch device for limiting the differential action is shown as a unit indicated generally by 20. This unit includes three gearwheels which respectively mesh with three gearwheels driven by the differential gear, the arrangement being as follows: a gearwheel 21 secured to the sunwheel driven shaft 10; two gearwheels 22, 23 both splined to the extension shaft 11 of the planet carrier; a gearwheel 24 driven by the gearwheel 21; gearwheels 25 and 26 respectively driven at higher and lower speeds than the gearwheel 24 by the gearwheels 22 and 23.

The unit 20 is enclosed in and supported by a housing 27. The unit itself encloses clutch mechanism comprising two one-way clutches. The mechanism includes a rotary central shaft 30 which is supported at opposite ends by bearings 31 in the housing 27. The gearwheel 24 is keyed to this shaft, which therefore is rotated by the associated sunwheel of the differential gear. The shaft 30 incorporates two members 32 and 33 of the one-way clutches, which members consist of splined portions of the shaft. Complementary members 34 and 35 of both clutches consist of hollow outer parts which are both formed with internal helical teeth 36 and which are respectively connected integrally with the gearwheels 25 and 26. Thus, the clutch members 34 and 35 are rotated by the planet carrier 110A of the differential gear respectively at higher and lower speeds than the shaft 30 under conditions when there is no differential action by the gear. It will therefore be apparent that in one of the clutches the member 32 is the running member and the member 34 over-runs, whereas in the other clutch the member 35 is the running member and the member 33 over-runs.

Each of the clutches also includes a presser 40, and this presser has external helical teeth 41 which are in engagement with the teeth 36.

The clutch unit includes a hydraulic cylinder 42 in which the clutch members 34, 35 are sealed but rotatably fitted and the cylinder 42 contains a pair of annular pistons 43. These pistons are arranged face-to-face and they are spaced apart so that there is formed between them an annular space 44 which is filled with a ring of oil, this ring is called herein a hydraulic abutment. A pack consisting of two sets of friction plates 45 is interposed between each piston 43 and the associated presser 40. Thus, when the oil in the space 44 is under pressure, it serves as an abutment capable of a co-operating with either presser 40 to compact the friction plates 45 packed between them.

In each clutch, one set of the friction plates 45 is splined to the inner clutch member 32 or 33 and the other set is splined to the outer clutch member 34 or 35.

Each presser 40 is acted upon axially by a compression spring 46 which urges the presser towards the hydraulic abutment 44. The pressers are movable to only a small extent, their range being limited by stop rings 46A in the outer clutch members 34, 35. Each presser 40 is also acted upon rotationally by a tension spring 47 which is circumferentially connected between the outer clutch member 34 or 35 and the presser and which urges the presser to unwind itself away from the hydraulic abutment.

The components of each clutch are similar to the components of the other clutch.

In the example, the hydraulic-abutment space 44 is supplied with oil through a branch 51 of the housing 27. This branch is connected through a passage 53 and a spring-pressed non-return ball valve 52 to an axial hole 54 in the shaft 30 connected by ports 55 to the space 44. An exhaust valve 56, which is fitted to the housing 27, normally closes an outlet passage 54A which is an extension of the axial hole 54 and which leads to an exhaust port 57 leading to the sump of the housing. A spring-urged sealing piston 58 is inserted in the adjacent end of the shaft 30 to seal the joint between the hole 54 and its extension 54A in the housing 27.

Under normal driving conditions, while the vehicle is directed straight forwards, there is no differential action in the gear and therefore the planet-carrier and the sun-wheels and the propeller shafts all rotate in unison as a rigid body. Under these conditions, in one of the clutches the outer member 34 over-runs the inner member 32. Under the oil pressure in the hydraulic-abutment space 44, the pistons 43 are pressed against shoulders presented by skirt rings 40A on the pressers. The two sets of friction plates 45 rotate idly, the set splined to the presser 40 being somewhat faster than the other set and exerting a very slight frictional drag, the effect of which is that the presser 40 bears against the wall 40B of the presser. On the other hand, in the other clutch, it is the set of friction plates that are splined to the inner member 33 which rotate faster, but the effect is the same.

Under the foregoing conditions the differential gear is effective but controlled. Thus, as the vehicle is steered to one or other side, the customary differential action will occur.

Let it be supposed that a road wheel or both road wheels at the rear of the vehicle rides or ride over an icy surface and tends or tend to spin. Both inner clutch members 32, 33 will accelerate, the pressers 40 accelerating with them. As the speed of the inner clutch member 32 reaches and tends to pass equality with the speed of the normally over-running outer member 34, the frictional drag of the friction plates 45 at first ceases and thereafter is reversed, with the result that the presser 40 with the assistance of its spring 46 starts to wind itself rotationally and axially through the outer clutch member 34, so that the friction plates are tightly compacted against the reaction of the hydraulic abutment; and so the clutch becomes locked. That is to say, the sunwheel is locked to the planet carrier and the differential freedom is terminated. Accordingly, spinning of the rear road wheel or wheels is hindered or prevented by the tractive grip of the front road wheels.

When normal conditions are resumed, the presser 40 unwinds itself under the drag of the clutch plates 45 splined to the inner clutch member 32 with the assistance of the circumferential tension spring 47.

Let it be supposed, on the other hand, that one or both road wheels at the front tends or tend to lock and skid under heavy braking on a poor ground surface, the effect will be to decelerate the front propeller shaft and this action, through the controlled differential gear, will be to accelerate the rear propeller shaft 10. Thus, the one-way clutch 32, 34 will again function in the manner described to lock the differential gear. Accordingly, the tractive grip of the rear road wheels will act to hinder or prevent locking of the front road wheel or wheels.

The other one-way clutch 33, 35 acts correspondingly in the event that the rear road wheel or wheels tends or tend to lock and in the event that the front road wheel or wheels tends or tend to spin. In either of these contingencies, the outer normally over-running clutch member 33 will decelerate to and below the speed equality with the outer clutch member 35, in which event these clutch members inter-lock.

In the example, disablement of the one-way clutches is attained simply by exhausting the hydraulic abutment by opening the valve 56. In this event, the pistons 43 loose their rear support, and if either presser 40 advances towards the other to the short extent permitted by the stop ring 46A, the pistons merely recede idly and the friction plates 45 remain ineffective.

Referring to FIG. 2, the hydraulic appliance therein shown includes a low-pressure pump which is indicated by 60. The delivery branch of the pump is shown diagrammatically, at 61, detached from the pump. The branch 61 is associated with a return conduit 62 having a spring-closed non-return valve 63 leading to the suction side of the pump. The pump is of the gearwheel type, comprising two intermeshing gearwheels 64, 65 working between casing parts 66, 67 in a housing 68, which forms the sump from which the pump draws the oil which it delivers. The gearwheel 64 has any appropriate mechanical connection with a road wheel of the vehicle, the arrangement being such that the pump is effective only when the road wheel is rotating forwards. In the example, the shaft 69 of the gearwheel 64 has a connection 70 with a shaft 71 carrying a screw gearwheel 72 which meshes with a screw gearwheel 73, and the gearwheel 73 has a driving connection with the road wheels through a screw gearwheel 120 on the extension shaft 11 of the planet carrier.

The driven gearwheel 72 is not rigidly attached to the shaft 71; instead, the gearwheel 72 has a helical connection with a helically toothed enlargement 74 on the shaft, and this enlargement bears against a thrust face 75 on the casing part 66. The helix angle of the said connection is of such an inclination and to such hand that when the gearwheel 72 is rotated with the road wheels, with the vehicle moving forwards, the shaft 71 is axially displaced in the direction away from the thrust face 75 by the reaction of the work of the pump. Such axial displacement is permitted by the connection 70, which consists of inter-engaging prongs on the shafts 69, 71.

The pump delivery branch 61 is connected through a conduit 80 to another conduit 81 which leads from a separate low-pressure oil system and which is supplied by an engine-driven pump shown diagrammatically at 81A. This other pump may be connected to the engine shaft by any appropriate means such that when the engine rotates the pump is operative. The conduits 80, 81 lead to a common supply conduit 83 which is under the control of the axially displaceable shaft 71.

The housing 68 is provided with a valve assembly to the inlet branch 84 of which the supply conduit is connected and which has an outlet branch 85 connected by a conduit 86 to the hydraulic clutch device (FIG. 1). The valve assembly also has an exhaust port 87 opening into the sump formed by the housing 68. The valve assembly includes two ball valves 90 and 91, between which a thrust rod 92 is interposed. The lower ball 90 is supported on the end of the axially displaceable shaft 71 and the upper ball 91 is pressed downward by a spring 93. The seats of both ball valves and the outlet branch 85 are interconnected by internal ports 94.

The conduit 86 has two branch conduits 100 and 101. The conduit 100 is connected to the branch 51 of the housing 27 (FIG. 1). It is through this branch that the hydraulic clutch device is supplied with low-pressure oil. The branch conduit 101 is connected to a cylinder 102 on the exhaust end of the housing 27. In the cylinder 102 there is a piston 103 with a projection 104 which normally presses upon a ball which is the movable member of the exhaust valve 56, this piston serving to maintain the valve closed.

In operation of the hydraulic appliance under normal ahead running conditions, a continuous static head of oil from the conjoined pump systems extends past the upper valve 91 and through the outlet branch 85, conduit 86, branch conduit 100 and axial hole 54 to maintain the oil abutment in the space 44. The oil delivered by the pump 60 circulates from the pump past the open valve 63 to the sump. Under these conditions, the shaft 71 is displaced axially, and remains so displaced, by the reaction to the work of the pump 60, so that the lower valve 90 is closed and the upper valve 91 is opened by the thrust rod 92 against the pressure of the spring 93.

Let it be supposed that the forward travel of the vehicle ceases, so that the road wheels cease to rotate. The pump 60 simultaneously ceases to be driven and ceases its work, thereby offering no resistance to rotation of the axially displaced shaft 71, which is thus urged to return to its initial position by the compressed spring 93 acting through the ball valve 91, rod 92 and ball valve 90. Accordingly, the valve 91 closes the oil supply from the conjoined systems, the valve 90 opens the ports 94, conduit 86, branch 101 and cylinder 102 to exhaust, so that the exhaust valve 56 is opened and the interior of the hydraulic clutch including the oil abutment is exhausted. That is to say, the means controlling the differential gear is disabled and thereafter the differential gear is free to perform its full normal differential function.

If the vehicle is driven or moved in the reverse the road wheels 100 will rotate in the reverse direction causing the rear shaft 10 to rotate in reverse. The reverse motion is transmitted through the planet carrier 110A, shaft 11, gear 120, to gearwheel 73. The hydraulic clutch device remains disabled, since the drive to the pump is now reversed, and the gearwheel 72 is forcibly held downwards relatively to the helix 74 against the abutment face 75, thereby being positively prevented from opening the upper valve 91 and ensuring that the hydraulic abutment space 44 of the hydraulic clutch remains exhausted. Hence, as in the case of a stationary vehicle, the means controlling the differential gear is disabled, and the differential gear is free to perform its full normal differential function.

As soon as the vehicle moves or is driven in the forward direction, the drive to the pump 60 is re-established so that the shaft 71 is displaced axially to close the exhaust valve 90 and open the supply valve 91. Thus, the exhaust valve 56 is caused to close and full pressure is created in the interior of the hydraulic clutch device, which therefore is set in condition to exercise control of the differential gear.

In the example, the hydraulic clutch device is disabled solely by the road-wheel-driven hydraulic appliance. If desired additional disabling means may be provided. Accordingly, the extension 54A of the axial hole 54 is provided with a branch 105 to which any appropriate exhaust device may be applied.

I claim:
1. A controlled differential gear mechanism in a motor vehicle transmission mechanism of the type stated in combination with control means including a hydraulic clutch device connected with components of the differential gear; a hydraulic pump having a driving connection with a roadwheel of the vehicle, conduit means connecting the pump and hydraulic device, a valve assembly through which liquid from the pump is supplied to the hydraulic clutch device and is exhausted therefrom, conduit means connecting the pump and valve assembly, alternatively, and a member which is included in said driving connection and is displaceable by the reaction to the pumping action, such displacement causing opening of said valve assembly to supply and closed to exhaust, said member being returnable on cessation of the forward drive from the roadwheel to a position connecting exhaust to the hydraulic clutch device.

2. A differential gear mechanism as claimed in claim 1, in which said member is a driven shaft which is axially displaceable by said reaction against the action of a return spring to open a supply valve and close an exhaust valve in said valve assembly, and said shaft is connected at one end to the pump shaft by a sliding connection permitting said displacement of the driven shaft while maintaining its driving connection with the pump shaft.

3. A differential gear mechanism as claimed in claim 2, in which said driven shaft carries a first screw gearwheel meshing with a second screw gearwheel driven from said roadwheel, said first gearwheel having a helical connection with a helically toothed enlargement on the driven shaft bearing against a thrust face on part of the pump casing, the helix angle of said helical connection being of such inclination and to such hand that when the first gearwheel is rotated by the drive from the roadwheel, with the vehicle moving forwards, the driven shaft is axially displaced in the direction away from said thrust face by the reaction to the work of the pump.

4. A differential gear mechanism as claimed in claim 3, in which said second gearwheel meshes with a gearwheel connected to a component of said differential gear.

5. A differential gear mechanism as claimed in claim 2 in which said supply and exhaust valves in the valve assembly are ball valves, the adjacent end of the driven shaft engaging the ball of the exhaust valve, and movement of one ball being imparted to the other by a rod slidably mounted in the body of the valve assembly.

6. A differential gear mechanism as claimed in claim 5 in which said return spring acts on the ball of the supply valve.

7. A differential gear mechanism as claimed in claim 1 in which said valve assembly is supplied with liquid also by a second pump which is driven from the engine of the vehicle, so that the supply is available after normal engine starting of the vehicle and driving downhill starting of the engine and starting under tow.

8. A differential gear mechanism as claimed in claim 1 in which the roadwheel-driven pump is a gear pump located in a sump which houses said displaceable member and mounts said valve assembly.

9. A differential gear mechanism as claimed in claim 1 in which the valve assembly on its output supply side is connected by a pipe to one end of an axial hole in a shaft of the hydraulic clutch device passing through the liquid pressure chamber of said device, said hole being branched to said chamber, and at its other end being connected through a valve to exhaust, and said valve being held to close the exhaust by a piston in a cylinder actuated to close the valve by liquid pressure from a pipe branched from said supply pipe.

10. A differential gear mechanism as claimed in claim 9 in which said axial hole is also connected to another exhaust outlet connectible to an additional disabling means not controlled by a roadwheel.

References Cited by the Examiner
UNITED STATES PATENTS 2,583,307  1/1952  Schneider _____ 74—711
2,722,140  11/1955  Cabell _____ 74—711

FOREIGN PATENTS 878,700  10/1961  Great Britain.

DAVID J. WILLIAMOWSKY, *Primary Examiner.*
DON A. WAITE, *Examiner.*
R. D. GRAUER, J. A. WONG, *Assistant Examiners.*